(12) United States Patent
Tadano et al.

(10) Patent No.: US 6,572,088 B2
(45) Date of Patent: Jun. 3, 2003

(54) VIBRATION ISOLATING BUSHING

(75) Inventors: Hideo Tadano, Osaka (JP); Masanao Kameda, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/935,220

(22) Filed: Aug. 22, 2001

(65) Prior Publication Data

US 2002/0079629 A1 Jun. 27, 2002

(51) Int. Cl.[7] ................................ F16F 1/387
(52) U.S. Cl. .................. 267/141.3; 267/219; 267/220
(58) Field of Search ............... 287/141.1, 1, 141.7, 287/292, 293, 219, 220

(56) References Cited

U.S. PATENT DOCUMENTS

| | | | | |
|---|---|---|---|---|
| 2,706,126 A | * | 4/1955 | Thiry | 267/141.3 |
| 3,437,301 A | * | 4/1969 | Newberry et al. | 267/141.4 |
| 4,139,246 A | * | 2/1979 | Mikoshiba et al. | 267/141.3 |
| 4,667,943 A | * | 5/1987 | Izumi et al. | 267/141.3 |
| 5,301,414 A | | 4/1994 | Gautheron | |
| 6,164,405 A | * | 12/2000 | Sakata | 267/141.3 |

FOREIGN PATENT DOCUMENTS

JP         2000-2278         1/2000

* cited by examiner

*Primary Examiner*—Matthew C. Graham
(74) *Attorney, Agent, or Firm*—Jordan and Hamburg LLP

(57) ABSTRACT

This invention provides, in a vibration isolating bushing comprising an inner and an outer cylinders cencentrically spaced apart and a rubber elastomer interconnecting both cylinders by vulcanization forming, such that it is possible to ensure sufficiently a forcing allowance of the outer cylinder when press fitted to a support member, to improve the workability upon assembling, and to avoid the outer cylinder from releasing and dropping off from the inner cylinder even if the rubber elastomer is ruptured. According to its expedient, the inner cylinder is formed at its axial extremities with outwardly upset portions, the outer cylinder is formed at its one axial extremity with a flange portion having a larger diameter than an outside diameter of the upset portion, and an inside diameter of the extremity of the outer cylinder is made smaller than the outside diameter of the upset portion.

2 Claims, 3 Drawing Sheets

VIBRATION ISOLATING BUSHING

BACKGROUND OF THE INVENTION

1. Field of the Invention

This invention relates to a vibration isolating bushing mainly used, being built-in in a suspension system of an automobile, etc.

2. Description of the Related Art

Hitherto in an automobile suspension system, vibration isolating bushings have been used for the purposes of vibration damping and shock absorbing at connecting parts of the vehicle body and the suspension, namely, each connecting part between a support member such as a control arm carrying wheels, etc. and a body side member such as body frame and the like. It is also known that a tubular vibration isolating bushing has been used as an engine mount.

In FIG. 3 is shown one example of a conventional vibration-proof bushing 20 in cross-sectional view. The vibration-proof bushing 20 is made up of an inner cylinder 22 and an outer cylinder 23 made of a metal and disposed concentrically, and a rubber elastomer 24 interposed between the inner and outer cylinders 22, 23.

As for the aforesaid inner cylinder 22, an inner cylinder assuming a straight form was generally employed in the past, but at terminal edges of such straight cylinder in the state of use each constituting a contact surface with another member, their surface pressures were high. Recently with a view to inhibiting such high surface pressures at the terminal edges of inner cylinder during use, an approach of upsetting extremities of the inner cylinder 2 has been being adopted thereby to enlarge the areas of the edges as illustrated in FIG. 3. In that case, in order to enlarge the areas of extremities of the rubber elastomer 24 between the inner and outer cylinders and to secure sufficiently a free length from elastic deformation, it was further proposed to perform the upsetting forming by subjecting extremities of the inner cylinder 22 to plastic working such as ironing working after vulcanization forming (JP Registered Patent No. 2723424). The reference numeral 25 designates the upset portion.

The vibration-proof bushing 20 is used in the state that the inner cylinder 22 inserts therein a shaft member 11 as one support member to be fastened to a member 12 on the vehicle body side, such as body frame whereas the outer cylinder 23 is press fitted and secured into a hole 14 for attachment of the other support member 13 such as a wheel-supporting arm. In this press fitting of the outer cylinder 23, formerly as illustrated in FIG. 3, in order that forcing or push-in may be performed by the use of a jig for press fitting, its axially one extremity was once upset radially outwardly and then bent radially inwardly into an inward bend form thereby to secure a forcing allowance for the jig. However, a problem encountered when the vibration-proof bushing 20 was press-fitted in the attachment hole 14 of the support member 13 was that the press-fit jig for forcing or urging the outer cylinder 23 was prone to slip at the inward bend portion 26, so that it was difficult to force the jig with the result that workability was reduced.

Further, as is the case with FIG. 3, in case where the vibration-proof bushing 20 was used with its axis center oriented vertically (up-and-down direction) and with the support member 13 on the arm side, which press fits fixedly the outer cylinder 23, suspended and supported to the body side member 11, if the rubber elastomer 24 between the inner and outer cylinders 22,23 was separated or ruptured, there was a risk of the outer cylinder 23 releasing or falling off from the inner cylinder 22. The case was also true when the bushing 20 was likewise used with its axis center oriented horizontally.

In view of the aforementioned problems or difficulties, this invention has been accomplished and provides a vibration isolating bushing constructed so that a forcing allowance sufficient to press fit the outer cylinder to a support member can be secured and accordingly, the workability in assembling work can be improved, and even if a rupture occurs at the rubber elastomer, the release, detachment or falling of the outer cylinder from the inner cylinder can be avoided.

SUMMARY OF THE INVENTION

This invention resides in a vibration isolating bushing comprising an inner cylinder, an outer cylinder disposed outwards of it to be spaced apart, and a rubber elastomer interposed between and interconnecting the inner and outer cylinders by vulcanization forming, which bushing is characterized in that the inner cylinder is subjected to upsetting forming at its axial extremities outwardly, thus forming upset portions, the outer cylinder is formed, at its one axial extremity, with a flange portion, the flange portion having a larger diameter than an outside diameter of the upset portion; the one axial extremity of the outer cylinder has an inside diameter which is made smaller than the outside diameter of the upset portion.

According to the vibration isolating bushing of the invention, when press-fitted to an attachment hole of a member to be assembled, it is possible to abut the top end of a press-fit jig securely on the flange portion of the outer cylinder at its extremity and accordingly, to force and press fit the bushing securely without any risk of causing slipping or disengagement of the jig. Thus the workability in assembling the vibration isolating bushing can be enhanced.

Furthermore on account of the construction that the inside diameter of the flange portion of the outer cylinder at its one extremity is made smaller than the outside diameter of the upset portion of the inner cylinder at its extremity, even if a rupture or the like occurs at the rubber elastomer between the inner and outer cylinders and as a result, the outer cylinder is released or falls off from the inner cylinder, the smaller-diameter portion of the outer cylinder at the extremity is able to abut on the upset portion at the extremity of the inner cylinder, thus impeding further release or detachment. As a consequence, when using in a manner that the arm side support member, into which the outer cylinder is press-fitted and fixed with its axial center oriented vertically, is supported to the body side member to which the inner cylinder is secured in a suspended manner, it is possible to obviate the risk of the outer cylinder being detached and coming off from the inner cylinder even if a rupture or the like occurs at the rubber elastomer.

In the vibration-isolating bushing as described above, it is preferred that the one axial extremity on the flange portion side of the outer cylinder be slightly diminished in diameter so that its inside diameter is smaller than the outside diameter of the upset portion at the extremity of the inner cylinder. The process of upsetting forming the extremity of the inner cylinder, for example, by plastic working, etc. has its own limits in upsetting degree. Therefore the one extremity of the outer cylinder is diminished in diameter as mentioned above simultaneously when forming the flange portion by drawing working, etc., whereby it is easily possible to make the inside diameter of the outer cylinder at the extremity smaller than the outside diameter of the upset portion of the inner cylinder at its extremity.

It is preferably after vulcanization forming that the terminal upset portion of the inner cylinder is formed by plastic working so as to enlarge its edge surface. Thus it is possible to make the area of the terminal surface of the rubber elastomer larger and to secure sufficiently a free length to the elastic deformation, thereby improving its durability.

DESCRIPTION OF THE PREFERRED EMBODIMENTS

Embodiments of the invention will be hereinafter described by way of examples with reference to the drawings.

Figure 1:
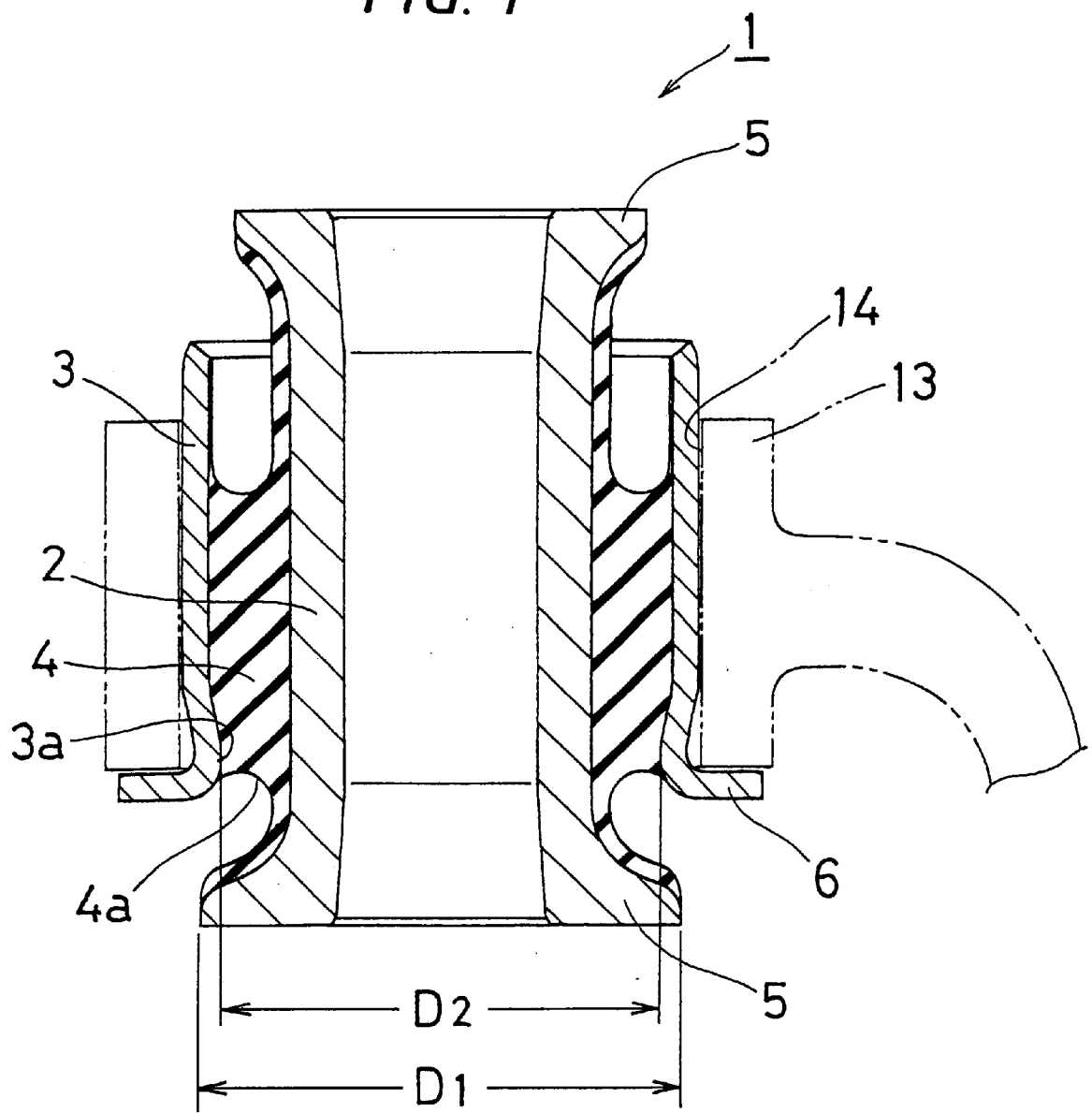
FIG. 1 is a cross-sectional view showing one example of a vibration isolating bushing of this invention.
Figure 2:
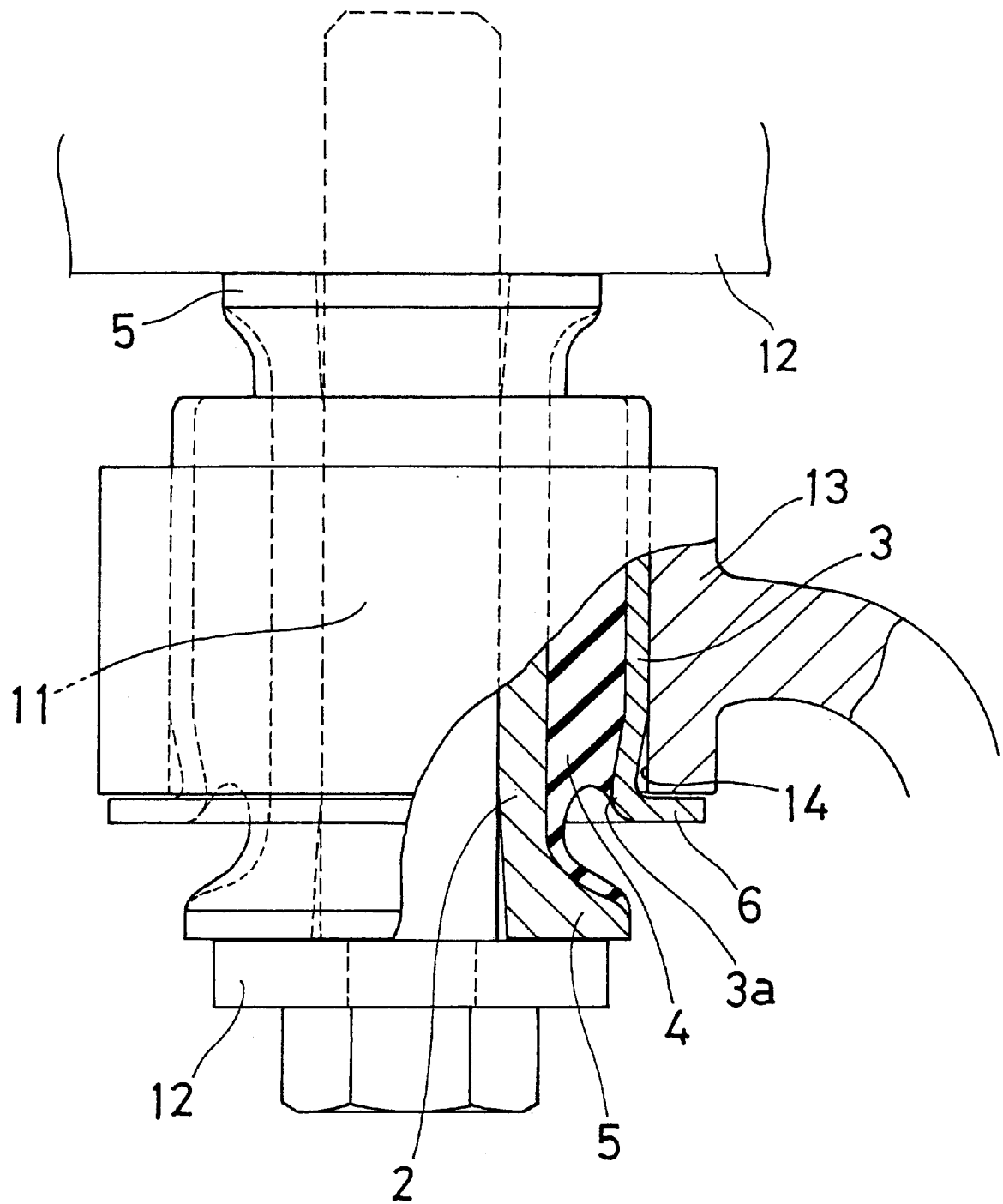
FIG. 2 is a partly cutaway elevational view of the vibration isolating bushing in FIG. 1 showing its state of use.
Figure 3:
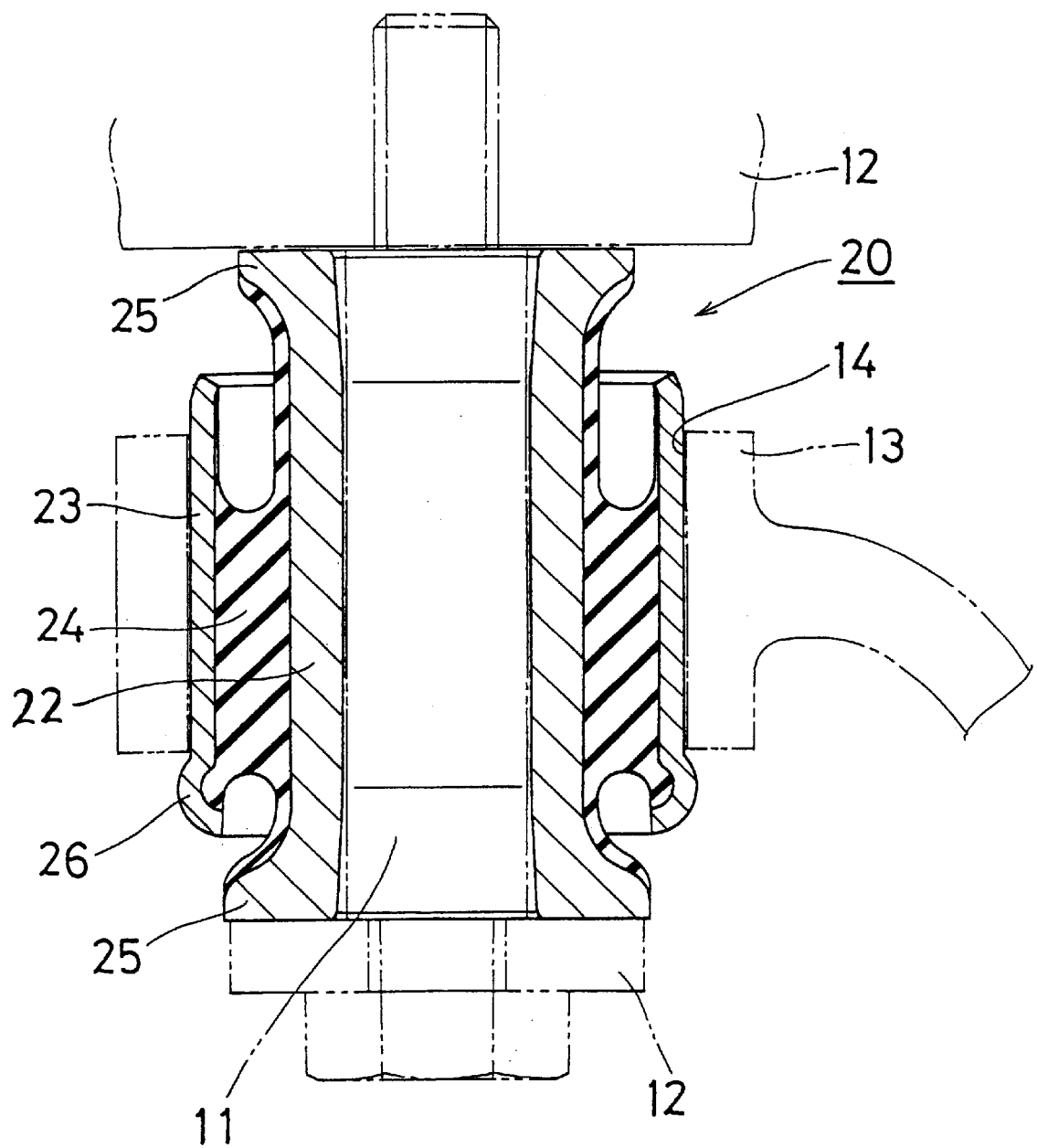
FIG. 3 is a cross-sectional view of a prior art vibration-proof bushing having a fundamental construction similar to that of the invention.

FIGS. 1 and 2 are a sectional view and a partly cutaway front view, respectively, of a vibration isolating bushing as one example of this invention. In this example, a vibration isolating bushing 1 is constructed of an inner cylinder 2 and an outer cylinder 3 disposed concentrically in spaced relation and made of a metal such as iron, steel, aluminum or alloys thereof, and a rubber elastomer 4 interposed between and interconnecting integrally the inner and outer cylinders 2,3. The rubber elastomer 4 is secured to both the outer peripheral surface of the inner cylinder 2 and the inner peripheral surface of the outer cylinder 3 by the means of vulcanization adhesion.

The inner cylinder 2 has a length somewhat longer than lengths of the outer cylinder 3 and the rubber elastomer 4, and is formed, at least at its one axial extremity, for example, both extremities as in FIG. 1, to be upset outwardly so as to enlarge the area of its terminal edge surface. The reference numeral 5 designates an upset portion.

As an expedient for upsetting the extremity of the inner cylinder 2, for example, it may be possible to preform it by forging working or the like, but in practice, it is preferred to conduct upsetting by plastic working subsequently to vulcanization forming of the rubber elastomer 4.

For the inner cylinder 2, a straight pipe, both ends of which are not subjected to upsetting working, is employed and cut in a length longer than the length of the final product. Between the inner cylinder 2 and the outer cylinder 3, the rubber elastomer 4 is interposed and vulcanization formed. Subsequently to the vulcanization forming, the extremities of the inner cylinder 2 are subjected to plastic deformation, for example by ironing working with the aid of a working jig, which is put in eccentricity at a definite angle to the axis center of the inner cylinder, to be upset. In this way, the inner cylinder 2 can be worked into the configuration as illustrated in FIG. 1 and it is possible to secure a sufficient area to reduce the surface pressure against the axial strength due to fastening to a support member without increasing the wall thickness of the inner cylinder. And the rubber elastomer 4 can be formed at its terminal surface 4a to assume an undercut shape as illustrated in FIG. 1, with the result that the area and free length of the terminal surface 4a can be secured sufficiently.

On the other hand, the outer cylinder 3 is provided at its one axial extremity with a flange portion 6 which is formed by being bent radially outwardly. The flange portion 6 has a larger diameter than an outside diameter D1 of the upset portion 5 of the inner cylinder 2 located correspondingly to it so that a forcing allowance can be ensured when press fitted to a support member.

Furthermore, an inside diameter D2 of the one axial extremity 3a of the outer cylinder 3, at which the flange portion 6 is formed, is made smaller than the outside diameter D1 of the upset portion 5 of the inner cylinder at its extremity. In particular, with the example as shown in the figure, the one axial extremity 3a is diminished in diameter by drawing working in a slightly taper form so as to have a smaller inside diameter D2 than the outside diameter D1 of the upset portion 5. This diameter diminution working can be performed concurrently with the drawing working for forming the flange portion 6.

The vibration isolating bushing 1 thus constructed above is used to connect and support a control arm of a suspension carrying wheels or the like to a vehicle body side member as shown in FIG. 2. Here, when the vibration isolating bushing 1 is used, its axial center is oriented vertically and the outer cylinder 3 is press fitted into an attachment hole 14 of a support member 13, such as a control arm of a suspension supporting wheels and fixed to it. Upon press fitting, it is possible to abut securely the top end of a press-fit jig against the flange portion 6 of the outer cylinder having a diameter larger than the upset portion 5 of the inner cylinder and accordingly, a reliable forcing and press fitting is possible without the risk of slipping or disengagement. In particular, in case where the extremity 3a on the flange portion 6 side of the outer cylinder 3 is formed to be diminished in diameter, as shown in FIG. 1, the axial forcing strength can be applied to the flange portion 6 in a well balanced manner, resulting in press fitting without causing deformation to the flange portion 6.

As for the inner cylinder 2, on the other hand, a shaft member 11 such as a fastening pin is inserted and enters through the inner cylinder 2 so as to be fastened through the shaft member 11 to a member 12 on the vehicle body side. At that time, fastening is performed in the state that the flange portion 6 of the outer cylinder 3 is downside as illustrated. In this way, the support member 13 such as an arm fixed to the outer cylinder 3 is supported to the the vehicle body side member 11 in a suspending condition, and as such the bushing is in a position to be used.

In the bushing, the inside diameter D2 of the outer cylinder 3 at its one extremity the flange portion 6 is smaller than the outside diameter D1 of the upset portion 5 at the extremity of the inner cylinder 2. On account of that construction, even if during use of the bushing the rubber elastomer 4 is ruptured or separated, as a result of which the outer cylinder 3 will detach and release from the inner cylinder, the extremity of smaller diameter serves to abut on the upset portion 5 at the extremity of the inner cylinder, so that further detachment and release is impeded and the outer cylinder can be prevented from falling out of the inner cylinder It will be appreciated that the present invention is not limited to the examples described above, but a wide variety of variations or modifications may be made without departing from the spirit and scope of this invention.

Thus far described, according to the vibration isolating bushing of this invention, the outer cylinder connected through the rubber elastomer to the inner cylinder is formed at its one axial extremity with the flange portion having a larger diameter than the outside diameter of the upset portion of the inner cylinder at its extremity. Hence when the vibration isolating bushing thus constructed is press fitted into an attachment hole of a member to be assembled, it is possible to securely force and press-fit the top end of a jig for press fitting into the flange portion, thus improving the workability upon assembling of the vibration isolating bushing. Moreover, because the inside diameter of the outer cylinder at its one extremity is made smaller than the outside diameter of the upset portion of the inner cylinder at the extremity, albeit the rubber elastomer is ruptured or cracked, the smaller-diameter extremity of the outer cylinder serves to abut on the upset portion at the extremity of the inner cylinder, so that releasing of both cylinders is inhibited and besides, there is no risk of the outer cylinder falling off in case where the bushing is used with the axial center oriented vertically so that the arm side member is supported in a suspending manner.

What is claimed is:

1. A vibration isolating bushing comprising:

an inner cylinder;

an outer cylinder disposed and spaced apart from the inner cylinder;

a rubber elastomer interposed between and interconnecting the inner cylinder and the outer cylinder by vulcanization forming;

the inner cylinder integrally including at its one axial end a flared portion;

said flared portion being formed by ironing an edge surface of said inner cylinder and thus enlarging said edge surface, an outer circumferential surface of said flared portion gradually expanding radially outwardly and downwardly;

said outer cylinder including a main body portion and a flange portion provided at one end thereof and extending radially outwardly, said flange portion forming a surface adapted to be pressed when said outer cylinder is press fitted into a support member therefor;

an outer diameter of said flange portion being larger than a largest diameter of said flared portion; and an inner diameter of said main body at said one end of said outer cylinder being smaller than said largest diameter of said flared portion, whereby when the elastomer fails, further release of the outer cylinder from inner cylinder at said one axial end of the inner cylinder is prevented by the flared portion.

2. The vibration isolating bushing as set forth in claim 1, wherein the one end of the outer cylinder has an inner diameter smaller than the outside diameter of the flared portion of the inner cylinder.

* * * * *